(12) United States Patent
Berger et al.

(10) Patent No.: US 12,103,596 B2
(45) Date of Patent: Oct. 1, 2024

(54) MOTOR VEHICLE COMPRISING A FLOOR SUBASSEMBLY AND A STORAGE CELL SUBASSEMBLY

(71) Applicant: Bayerische Motoren Werke Aktiengesellschaft, Munich (DE)

(72) Inventors: Helmut Berger, Munich (DE); Bernd Nurtsch, Gars-Bahnhof (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 443 days.

(21) Appl. No.: 17/420,802

(22) PCT Filed: Jan. 21, 2020

(86) PCT No.: PCT/EP2020/051391
§ 371 (c)(1),
(2) Date: Jul. 6, 2021

(87) PCT Pub. No.: WO2020/156885
PCT Pub. Date: Aug. 6, 2020

(65) Prior Publication Data
US 2022/0111909 A1    Apr. 14, 2022

(30) Foreign Application Priority Data
Jan. 28, 2019    (DE) ............... 10 2019 102 049.2

(51) Int. Cl.
*B62D 25/20*    (2006.01)
*B60K 1/04*    (2019.01)
(Continued)

(52) U.S. Cl.
CPC ............ *B62D 25/2036* (2013.01); *B60K 1/04* (2013.01); *B62D 25/025* (2013.01);
(Continued)

(58) Field of Classification Search
CPC ............ B62D 25/2036; B62D 25/025; B62D 27/065; B62D 29/008; B60K 1/04; B60K 2001/0438; B60Y 2306/01
See application file for complete search history.

(56) References Cited

U.S. PATENT DOCUMENTS

| 5,501,289 | A | * | 3/1996 | Nishikawa | ............ | B60K 1/04 |
| | | | | | | 280/783 |
| 9,692,030 | B2 | * | 6/2017 | Schüssler | ............ | H01M 50/522 |

(Continued)

FOREIGN PATENT DOCUMENTS

| CN | 105142968 A | 12/2015 |
| CN | 108987630 A | 12/2018 |

(Continued)

OTHER PUBLICATIONS

International Search Report (PCT/ISA/210) issued in PCT Application No. PCT/EP2020/051391 dated Apr. 7, 2020 with English translation (four (4) pages).

(Continued)

*Primary Examiner* — Gregory A Blankenship
*Assistant Examiner* — Sara Laghlam
(74) *Attorney, Agent, or Firm* — Crowell & Moring LLP

(57) ABSTRACT

A motor vehicle includes a floor subassembly and a storage cell subassembly. The floor subassembly is an integral part of a body of the motor vehicle. In other words, the floor subassembly is part of the body shell. The storage cells of the storage cell subassembly are disposed in the floor subassembly. The storage cells are accommodated in hollow-cylinder chambers of a multi-chamber hollow cylinder structure extending in the vertical direction of the vehicle.

16 Claims, 1 Drawing Sheet

(51) Int. Cl.
  B62D 25/02 (2006.01)
  B62D 27/06 (2006.01)
  B62D 29/00 (2006.01)

(52) U.S. Cl.
  CPC ......... B62D 27/065 (2013.01); B62D 29/008 (2013.01); *B60K 2001/0438* (2013.01)

(56) References Cited

U.S. PATENT DOCUMENTS

| | | | |
|---|---|---|---|
| 10,084,175 B1* | 9/2018 | Mastrandrea | H01M 10/0525 |
| 10,370,040 B1* | 8/2019 | Cooper | B62D 21/157 |
| 11,211,656 B2* | 12/2021 | Matecki | H01M 50/271 |
| 11,745,573 B2* | 9/2023 | Caliskan | B62D 27/065 |
| | | | 180/68.5 |
| 2012/0121949 A1 | 5/2012 | Eberhard et al. | |
| 2016/0006008 A1* | 1/2016 | Volz | H01M 50/249 |
| | | | 429/61 |
| 2017/0005383 A1 | 1/2017 | Harris | |
| 2018/0345778 A1 | 12/2018 | Yamanaka | |
| 2021/0070376 A1* | 3/2021 | Takahashi | B60K 1/04 |
| 2022/0111909 A1* | 4/2022 | Berger | B62D 29/008 |
| 2023/0307763 A1* | 9/2023 | Maguire | H01M 50/204 |

FOREIGN PATENT DOCUMENTS

| | | |
|---|---|---|
| DE | 103 52 046 A1 | 6/2005 |
| DE | 10 2008 029 200 A1 | 11/2009 |
| DE | 10 2011 118 383 A1 | 5/2012 |
| DE | 10 2012 203 882 A1 | 9/2013 |
| DE | 10 2013 204 765 A1 | 9/2014 |
| DE | 10 2016 115 647 B3 | 12/2017 |
| DE | 102016115611 B3 * | 2/2018 |
| EP | 3 412 486 A1 | 12/2018 |
| JP | 5-208617 A | 8/1993 |

OTHER PUBLICATIONS

German-language Written Opinion (PCT/ISA/237) issued in PCT Application No. PCT/EP2020/051391 dated Apr. 7, 2020 (six (6) pages).

German-language Search Report issued in German Application No. 10 2019 102 049.2 dated Jan. 20, 2020 with a partial English translation (12 pages).

English Translation of Chinese-Language Office Action issued in Chinese Application No. 202080006428.0 dated Nov. 29, 2023 (8 pages).

* cited by examiner

MOTOR VEHICLE COMPRISING A FLOOR SUBASSEMBLY AND A STORAGE CELL SUBASSEMBLY

BACKGROUND AND SUMMARY OF THE INVENTION

The present invention relates to a motor vehicle with a floor assembly and a storage cell assembly.

Motor vehicles which can be driven electrically, for example motor vehicles with pure electric drive or what are known as hybrid vehicles which have both an electric drive and an internal combustion engine drive, are already known. In the drive train, said motor vehicles usually have an electric motor for driving the motor vehicle and a traction battery, which can also be called a drive battery, which provides electric energy for the electric motor. A traction battery of this type is frequently also called a high-voltage energy store. It is known that battery cells can be combined in the traction battery to form battery modules. The battery cells or battery modules are accommodated in a fluid-tight housing of the traction battery, which housing serves to protect the battery cells and contains further apparatuses, for example for air conditioning and control of the battery cells. A traction battery of this type including the housing can be attached, for example, in the region of a floor of the motor vehicle between the front axle and the rear axle of the motor vehicle to an underside of the vehicle body as an assembly part.

For example, DE 102013204765 A1 discloses a storage cell structural unit, that is to say a traction battery, for storing electric energy for the drive of an electric motor of a motor vehicle. A housing of the traction battery is attached to an underside of the motor vehicle and, in addition, has an energy absorption region which is configured on outer edge regions of the housing and, in the case of a collision, contributes to a dissipation of collision energy, without the storage cells themselves which are accommodated in the housing being damaged. The housing is arranged between the side sills of the motor vehicle and is connected to them.

Furthermore, there are efforts to design a traction battery to be so wide that it is exactly as wide as a motor vehicle body. In this case, the traction battery or the traction battery housing overlaps completely with the vehicle undertray including the side sills. This has the advantage that the installation space below the vehicle undertray can be utilized in an optimum manner for the accommodation of battery cells, with the result that as great a power output or range as possible can be provided for the motor vehicle.

It is the object of the present invention to provide a motor vehicle with a floor assembly and a storage cell assembly, the floor assembly being an integral constituent part of a body of the motor vehicle, the motor vehicle body having a sufficient energy absorption capability in the case of a collision, it being possible for the storage cell assembly to receive a sufficiently large number of storage cells, and ease of maintenance and repair being increased at the same time.

Said object is achieved by way of a motor vehicle with a floor assembly and a storage cell assembly, which motor vehicle has the combination of features of the independent claim. Preferred developments of the invention are indicated in the dependent claims.

According to the invention, a motor vehicle has a floor assembly and a storage cell assembly. The floor assembly is an integral constituent part of a body of the motor vehicle. In other words, the floor assembly is a constituent part of what is known as the vehicle body shell. The storage cells of the storage cell assembly are arranged in the floor assembly. Here, the storage cells are arranged in hollow-cylindrical chambers of a multiple-chamber hollow-cylindrical structure which extends in the vehicle vertical direction. The multiple-chamber hollow-cylindrical structure is advantageously arranged in a cavity of the floor assembly.

The design which is integrated into the vehicle body makes it possible to accommodate the storage cell assembly in a manner which saves installation space. According to the invention, the storage cell assembly is not a storage cell assembly with a dedicated or independent, possibly fluid-tight housing which is mounted together with the housing as an assembly part or separate unit on the vehicle body. Instead, the space within the floor assembly of the vehicle body is utilized in a manner which saves installation space for accommodating the storage cells or the storage cell assembly. In other words, the floor assembly of the vehicle body is utilized as a housing or at least in part as a housing for the storage cell assembly. Here, the multiple-chamber hollow-cylindrical structure can assist a rigidity or strength of the floor assembly, with the result that, in the case of a collision of the motor vehicle, in particular a lateral collision of the motor vehicle, the multiple-chamber hollow-cylindrical structure can transmit and/or absorb sufficient collision energy. Here, the multiple-chamber hollow-cylindrical structure can also replace further crossmembers or longitudinal carriers of the vehicle body shell which would otherwise be required. Therefore, the space in the floor assembly can be utilized in an optimum manner for the accommodation of storage cells, there being strength in the case of a collision at the same time.

In addition to the storage cells, the storage cell assembly preferably has cooling apparatuses, current and control lines, and a control device.

The multiple-chamber hollow-cylindrical structure corresponds in cross section, that is to say a section in the vehicle longitudinal direction and vehicle transverse direction (a section in the x/y-direction in the vehicle coordinate system), to what is known as a tessellation or a regular tessellation. The body of the motor vehicle is what is known as a self-supporting body, a constituent part of which is the floor assembly.

The motor vehicle is, in particular, a motor vehicle with electric drive. Here, the storage cell assembly is a drive battery. The storage cell assembly can also be called a high-voltage battery or a traction battery.

The hollow-cylindrical chambers can advantageously have a polygonal, in particular regular polygonal, outline or cross section.

A four-sided, in particular rectangular or square, and/or a hexagonal, in particular regular hexagonal, and/or a triangular, in particular regular triangular, cross section are/is advantageous. The hollow-cylindrical chambers can, in particular, advantageously have the shape of a honeycomb.

The multiple-chamber hollow-cylindrical structure can fundamentally also have hollow-cylindrical chambers with different cross sections. The hollow-cylindrical chambers with different cross sections can then be combined with one another in the manner of a tessellation.

Accordingly, the shape of the hollow-cylindrical chambers can be adapted to the exterior shape of the storage cells.

The storage cells can advantageously have a circular shape or a cuboid shape.

In accordance with one preferred development, a single storage cell or a plurality of storage cells, for example two, three, four, five, six, seven, eight or nine storage cells, can be accommodated in one hollow-cylindrical chamber.

The multiple-chamber hollow-cylindrical structure can be produced, for example, by means of extrusion. For example, the multiple-chamber hollow-cylindrical structure can be produced from aluminum or an aluminum alloy.

As an alternative, the multiple-chamber hollow-cylindrical structure can also be produced from plastic or a fiber-reinforced plastic.

In accordance with one preferred development, the floor assembly has a lower floor and an upper floor. The lower floor and the upper floor can be of substantially plate-shaped configuration. The lower floor faces the underlying surface below the motor vehicle, and can also be provided with an underbody trim panel. The upper floor forms the floor of a vehicle interior compartment or a passenger compartment which is situated above the floor assembly. The lower floor and/or the upper floor can be an integral constituent part of the floor assembly. The lower floor and/or the upper floor can be connected to the floor assembly. The storage cell assembly is preferably arranged between the lower floor and the upper floor.

A lower end side of the multiple-chamber hollow-cylindrical structure can be connected to the lower floor, in particular in an integrally joined manner, for example by way of an adhesive bond or a welded joint. As an alternative, an upper end side of the multiple-chamber hollow-cylindrical structure can be connected to the upper floor, in particular in an integrally joined manner, for example by way of an adhesive bond or a welded joint.

As a result of the connection of the respective floor to the multiple-chamber hollow-cylindrical structure, the floor assembly is stiffened or reinforced further, and forms part of a load path in the case of a lateral collision.

The lower floor is fastened releasably to the vehicle body or the floor assembly. As an alternative, the upper floor can be fastened releasably to the vehicle body or the floor assembly.

As a result, simple accessibility to the storage assembly for assembly, maintenance and repair purposes is made possible by way of mounting and dismantling of the releasable floor.

The other floor of the lower floor and the upper floor which is fastened releasably to the floor assembly is preferably fastened to the vehicle body in a fixed manner, that is to say non-releasably, for example in an integrally joined manner. In other words, that floor of the lower floor and the upper floor which is fixed to the vehicle body forms a part of the vehicle body shell.

A rigidity and collision strength of the floor assembly are increased further by way of the floor which is fixed to the vehicle body.

An opening which can be closed by way of a cover can nevertheless be provided in the floor which is fixed to the vehicle body, however, for mounting, maintenance and repair purposes.

The lower floor and the upper floor can be fastened to one another or can be connected and braced to one another in a non-positive and/or positively locking manner. To this end, a spacer element can be arranged between the lower floor and the upper floor. In the region of the spacer element, the lower floor and the upper floor can be braced to one another via a screw connection.

This serves for further reinforcement of the floor assembly and, in addition, is advantageous in the case of the floor assembly grounding on a floor obstacle.

In accordance with a further preferred embodiment, the multiple-chamber hollow-cylindrical structure is arranged at least between two vehicle body longitudinal carriers and possibly additionally between at least two vehicle body crossmembers. The vehicle body longitudinal carriers can be side sills, that is to say outer lower vehicle body longitudinal carriers. The vehicle body longitudinal carriers can also, however, be vehicle body longitudinal carriers which are spaced apart from a vehicle body outer edge. A vehicle body longitudinal carrier can also be a centrally arranged vehicle body longitudinal carrier. The vehicle body longitudinal carriers and the vehicle body crossmembers are integral constituent parts of the vehicle body shell, and are accordingly connected non-releasably to adjoining vehicle body constituent parts. The vehicle body longitudinal carriers and the vehicle body crossmembers are a constituent part of the floor assembly. In particular, the abovementioned floor which is fixed to the vehicle body can be connected to the vehicle body longitudinal carriers and the vehicle body crossmembers. The releasable floor can in turn be screwed to the vehicle body crossmembers and the vehicle body longitudinal carriers or can be mounted releasably in some other way.

The floor assembly preferably forms a fluid-tight enclosure of the storage cell assembly. To this end, the upper floor, the lower floor, the vehicle body crossmembers and the vehicle body longitudinal carriers can be connected to one another in a fluid-tight manner.

Therefore, together with the lower floor and the upper floor, the floor assembly replaces a separate housing and an internal load-bearing structure of a conventional storage cell assembly which is configured as an assembly part. As a result, the motor vehicle can be of overall more compact configuration and/or more storage cells can possibly be accommodated. Furthermore, the housing of the storage cell assembly does not have to be manufactured and assembled separately in a complicated manner, but rather the floor assembly which serves as a storage cell assembly housing can be manufactured simply in the conventional vehicle body shell, apart from the releasable floor which is mounted on an assembly line.

The abovementioned supplementary features of the invention can be combined with one another in any desired way, in so far as this is possible and appropriate.

DETAILED DESCRIPTION OF THE DRAWINGS

A detailed description of one exemplary embodiment of the invention with reference to the figures follows.

Figure 1:
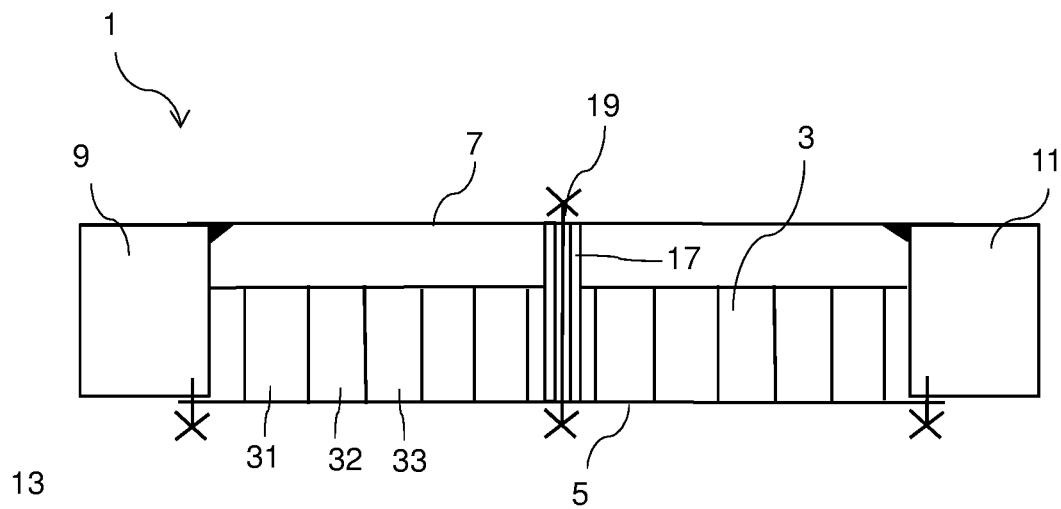
FIG. 1 is a diagrammatic sectional view through a floor assembly of a body of a motor vehicle with a storage cell assembly in accordance with one exemplary embodiment of the present invention.
Figure 2:
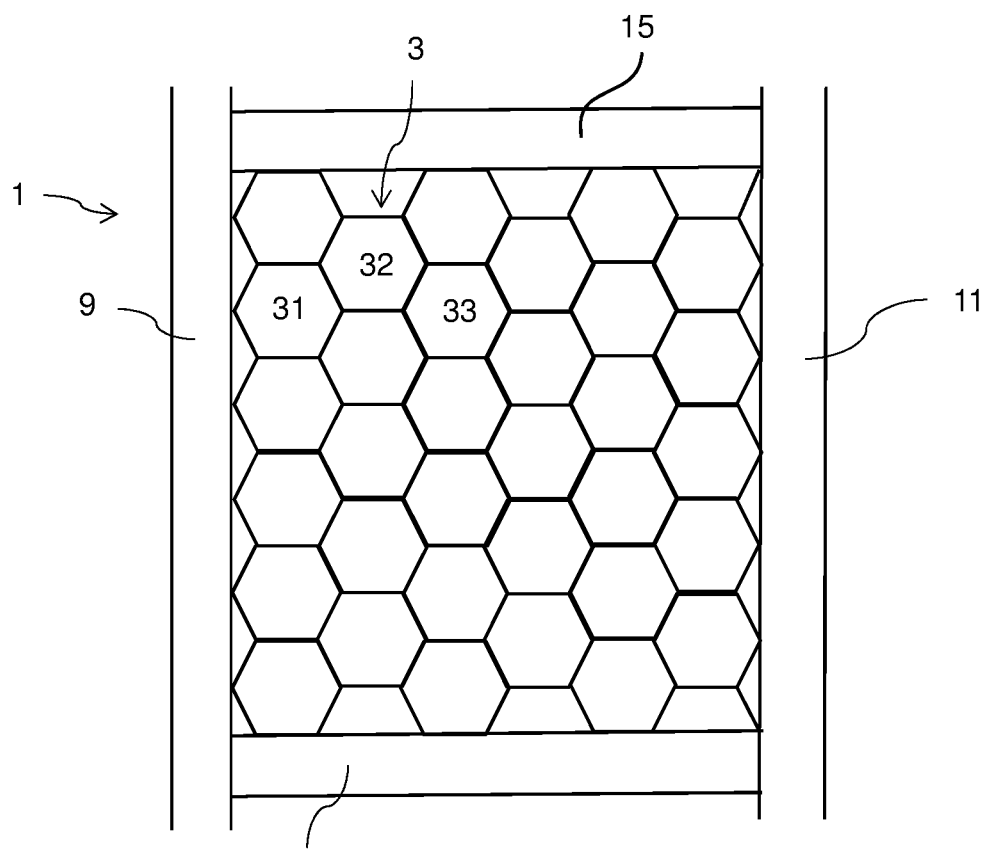
FIG. 2 is a diagrammatic top view of the floor assembly of the body of the motor vehicle with the storage cell assembly in accordance with the exemplary embodiment of the invention.

As shown in the sectional view of FIG. 1, a body of a motor vehicle with an electric drive has a floor assembly 1. A drive battery (not shown) which forms a storage cell assembly is accommodated or integrated in the floor assembly 1 between a lower floor 5 and an upper floor 7, between a left-hand side sill 9 and a right-hand side sill 11, and between crossmembers 13 and 15, which are shown in FIG. 2. Furthermore, a honeycomb structure 3 which forms a multiple-chamber hollow-cylindrical structure is arranged in the floor assembly 1, that is to say in a chamber which is formed by way of the floor assembly 1. The upper floor 7 is connected in an integrally joined manner to the side sills 9, 11 and the crossmembers 13 and 15, and therefore forms a constituent part of the vehicle body shell. The lower floor 5 is an assembly part, and is connected releasably, for example by means of screws, to the side sills 9, 11 and the crossmembers 13, 15. The honeycomb structure 3 is configured in the vehicle vertical direction, that is to say the individual honeycomb chambers 31, 32, 33 extend in the vehicle vertical direction.

The diagrammatic top view of FIG. 2 shows the floor assembly 1 from above, the upper floor 7 having been omitted. The side sills 9 and 11 and the crossmembers 13 and 15, which extend between the side sills 9 and 11, are shown. The honeycomb structure 3, which has a multiplicity of honeycomb chambers 31, 32, 33, can be seen between the side sills 9 and 11 and the crossmembers 13 and 15.

The honeycomb structure 3 is connected by way of its lower end side in an integrally joined manner to the upper side of the lower floor 5. Therefore, the honeycomb structure 3 and the lower floor 5 form a very stable structure in a similar manner to a sandwich structure.

For example, seven circular battery cells, that is to say storage cells, are accommodated so as to stand upright next to one another in each honeycomb chamber 31, 32, 33. More or fewer battery cells can also be received therein. The battery cells are not shown in the figures.

The honeycomb structure 3 is produced by means of extrusion from aluminum. The lower floor 5 is advantageously likewise produced from aluminum. The side sills 9 and 11 and the upper floor 7, and the entire vehicle body, are produced from steel, but can likewise be produced from aluminum in the case of a vehicle body made from aluminum.

As is shown in FIG. 1 by way of example at one point, the lower floor 5 and the upper floor 7 might be connected directly to one another via one or more spacer elements 17 and an associated screw connection 19. The spacer element 17 is an element which corresponds to the spacing between the lower floor 5 and the upper floor 7. Via a screw connection 19, the lower floor 5 and the upper floor 7 are braced to one another in the region of the spacer element 17. The spacer element 17 is configured, for example, as a sleeve with a through hole in the vertical direction, through which a screw of the screw connection 19 is guided. The bracing of the lower floor 5 and the upper floor 7 gives the floor assembly 1 even greater stability and is advantageous in the case of collisions from below, for example in the case of driving over objects and ground unevennesses.

The floor assembly 1, with the lower floor 5, the upper floor 7, the side sills 9 and 11 and the crossmembers 13 and 15, forms a fluid-tight enclosure of the drive battery with the battery cells and further components of the drive battery such as cooling apparatuses, current and control lines, and a control device. As a result, the drive battery is protected against environmental influences. As a result, furthermore, a discharge of battery contents into the surroundings and the passenger compartment is also prevented.

An intermediate space is provided between the honeycomb structure 3 and the upper floor 7, in which intermediate space, for example, the cooling apparatuses, the current and control lines and the control device are accommodated.

By way of dismantling of the lower floor 5, the drive battery can be removed from the floor assembly.

In the case of a lateral collision of the motor vehicle, a load path runs via the relevant side sill 9, 11 through the upper floor 7 and the lower floor 5 with the honeycomb structure 3. Here, the honeycomb structure 3 increases the rigidity of the floor assembly 1 in the region of the drive battery and in the process can replace an additional carrier structure in the interior of the drive battery with a simultaneous increase in the available space for battery cells. With identical collision strength, the motor vehicle can accommodate more battery cells and can therefore achieve a greater energy storage capacity. Every piece of installation space which is present in the floor assembly of the motor vehicle can likewise be utilized in this way for the accommodation of battery cells. Overall, an electric range of the motor vehicle can be increased with an identical collision strength.

What is claimed is:

1. A motor vehicle, comprising:
   a floor assembly; and
   a storage cell assembly, wherein
   the floor assembly is an integral constituent part of a body of the motor vehicle,
   storage cells of the storage cell assembly are arranged within the floor assembly, and
   the storage cells are arranged in hollow-cylindrical chambers of a multiple-chamber hollow-cylindrical structure which extends in a vehicle vertical direction, wherein
   the floor assembly includes an upper floor and a lower floor,
   the hollow-cylindrical chambers are positioned below the upper floor in the vehicle vertical direction, and
   the floor assembly is fastened together via a fastener that spans through the upper floor, through at least one of the hollow-cylindrical chambers, and through the lower floor.

2. The motor vehicle according to claim 1, wherein the hollow-cylindrical chambers have a polygonal cross section.

3. The motor vehicle according to claim 2, wherein the polygonal cross section is one of: a triangular, square, or a hexagonal cross section.

4. The motor vehicle according to claim 1, wherein one storage cell, two storage cells, three storage cells, four storage cells, five storage cells, six storage cells, seven storage cells, eight storage cells or nine storage cells are accommodated in one hollow-cylindrical chamber.

5. The motor vehicle according to claim 1, wherein the multiple-chamber hollow-cylindrical structure is made of aluminum or plastic.

6. The motor vehicle according to claim 5, wherein the multiple-chamber hollow-cylindrical structure is an extruded aluminum structure or a fiber-reinforced plastic structure.

7. The motor vehicle according to claim 1,
   wherein each of the lower floor and the upper floor either are an integral constituent part of the floor assembly or at least are connected to the floor assembly, and
   the storage cell assembly is arranged between the lower floor and the upper floor.

8. The motor vehicle according to claim 7, wherein a lower end side of the multiple-chamber hollow-cylindrical structure is connected to the lower floor, or an upper end side of the multiple-chamber hollow-cylindrical structure is connected to the upper floor.

9. The motor vehicle according to claim 8, wherein the connection is an integrally joined connection.

10. The motor vehicle according to claim 7, wherein the lower floor or the upper floor is fastened releasably, the other floor of the lower floor and the upper floor being configured so as to be fixed to the vehicle body.

11. The motor vehicle according to claim 7,
further comprising at least one spacer element configured to cooperate with the fastener, and wherein the fastener is at least one screw connection.

12. The motor vehicle according to claim 1, wherein the multiple-chamber hollow-cylindrical structure is arranged at least between two vehicle body longitudinal carriers, the vehicle body longitudinal carriers being a constituent part of the floor assembly.

13. The motor vehicle according to claim 12, wherein the multiple-chamber hollow-cylindrical structure is additionally arranged at least between two vehicle body crossmembers.

14. The motor vehicle according to claim 12, wherein the two vehicle body longitudinal carriers are side sills.

15. The motor vehicle according to claim 7, wherein the floor assembly forms a fluid-tight enclosure of the storage cell assembly.

16. The motor vehicle according to claim 1, wherein the hollow-cylindrical chambers defines a honeycomb structure.

* * * * *